United States Patent [19]

Vallier et al.

[11] Patent Number: 5,178,885
[45] Date of Patent: Jan. 12, 1993

[54] RESIN TRANSFER MOLD

[75] Inventors: Paul A. Vallier, Kensington; Philip J. Ramey, Milford; Donald J. Baumgarten, Cheshire; Terry M. Boustead, West Haven, all of Conn.

[73] Assignee: United Technologies Corporation, Hartford, Conn.

[21] Appl. No.: 368,519

[22] Filed: Jun. 20, 1989

[51] Int. Cl.⁵ .................. B29C 45/02; B29C 45/14; B29C 45/33

[52] U.S. Cl. .................. 425/117; 425/126.1; 425/394; 425/395; 425/544; 249/96; 249/160; 249/161; 264/135

[58] Field of Search .................. 249/91, 93, 161, 163, 249/165, 166, 96; 425/395, 397, 394, 396, 441, 545, 577, 330, 193, 125, 117, 553, 543, 544, 126.1; 264/135, 136, 257

[56] References Cited

U.S. PATENT DOCUMENTS

| | | |
|---|---|---|
| 3,418,690 | 12/1968 | Edwards .................. 425/397 |
| 4,090,687 | 5/1978 | Langhammer et al. .......... 249/160 |
| 4,127,378 | 11/1978 | Meadors .................. 425/397 |
| 4,235,833 | 11/1980 | Arnason et al. .................. 425/543 |
| 4,583,933 | 4/1986 | Woeljel et al. .......... 425/441 |
| 4,684,101 | 8/1987 | Wagner et al. .......... 425/193 |
| 4,932,013 | 7/1990 | Palmer et al. .......... 264/257 |

FOREIGN PATENT DOCUMENTS 2132132 6/1984 United Kingdom .............. 425/330

*Primary Examiner*—Jay H. Woo
*Assistant Examiner*—Khanh P. Nguyen

[57] ABSTRACT

A mold, adapted for resin transfer molding of composite articles, that has a seal for maintaining a vacuum resulting in denser composite parts. A mold body has at least two openings including an opening for removing the article therethrough. There are at least two mold closures adapted for closing the openings and two of the mold closures are in mutual contact within the interior of the mold. A seal is disposed between each closure and the mold body for sealing each mold closure to the mold body to continuously seal only a single surface. The mold has an improved seal for initiating and maintaining a vacuum thus reducing part porosity.

3 Claims, 3 Drawing Sheets

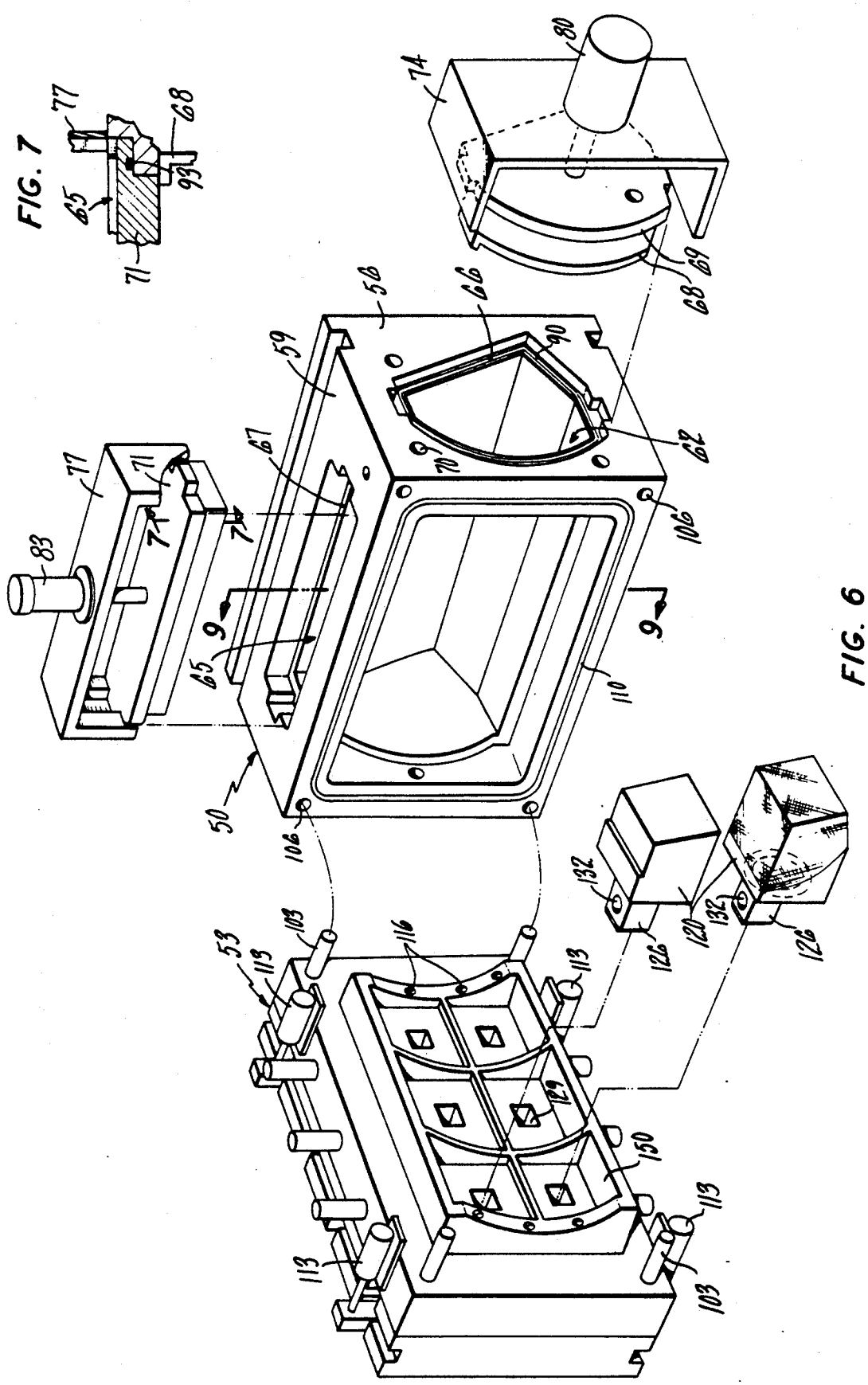

RESIN TRANSFER MOLD

DESCRIPTION

1. Technical Field

The field of art to which this invention pertains is molding apparatuses and more particularly resin transfer molds particularly adapted for manufacturing fiber reinforced composite components.

2. Background Art

In resin transfer molding, resin is injected under pressure into a mold cavity containing a dry composite fabric preform. The primary advantage of this process resides in its capacity for high rate production. Although this process is widely known, the use of resin transfer molding has not become widespread because of problems with the process. Use has typically been limited to rather simple, low-strength components (as compared to high-strength aerospace components). Some of the problems are related to the molding apparatuses typically used. For example, it is difficult to maintain adequate tolerances of the components because of problems associated with positioning the component within the mold, and mold pinching of the component. In addition, it is difficult to evacuate the mold prior to molding. These molding difficulties can result in disoriented fibers and porosity within the composite which greatly diminish the specific strength of the component. Due to the high costs of both fabrication and material, rejection of a single part out of a batch, can negate the savings initially sought through resin transfer molding.

Conventional resin transfer molds utilize a "take apart" mold that is assembled around the dry fabric preform. It is difficult to seal these molds for the application of vacuum because of the numerous metal-to-metal joints. Various techniques have been proposed to seal the mold, including passing resin through the mold until examination of the resin shows that there is no more air in the mold or enclosing the entire mold in a second chamber, however these techniques have problems. For example, the second chamber may have to be so large that it is impractical in order to enclose the mold and associated apparatus.

Thus, there is a continuing search in this field of art for resin transfer molds that obviate the above problems.

DISCLOSURE OF INVENTION

This invention provides an improved resin transfer molding apparatus that has an improved seal for initiating and maintaining a vacuum thus reducing part porosity. In addition, adequate access both in loading and unloading the preform and cured composite part are provided. Finally, pinching of the preform composite material is substantially reduced by the sliding side portions.

This invention is directed to a mold, adapted for resin transfer molding of composite articles, that has a seal for maintaining a vacuum resulting in denser composite parts. A mold body has at least two openings including an opening for removing the article therethrough. There are at least two mold closures adapted for closing the openings and two of the mold closures are in mutual contact within the interior of the mold. A seal is disposed between each closure and the mold body for sealing each mold closure to the mold body to continuously seal only a single surface.

Another aspect of this invention is directed to a mold, adapted for resin transfer molding of a composite article, that provides clearance within the mold for the unhampered removal of the article. A mold body has at least three openings including an opening for removing the article therethrough. There are at least three mold closures adapted for closing the openings. Two of the mold closures define, at a minimum, adjacent sides of the article to be molded and those two closures are in mutual sliding contact within the interior of the mold. The third mold closure has an orientation with respect to the contiguous closures so that the article is orthogonally unrestrained during removal.

Yet another aspect of this invention is directed to a mold, adapted for resin transfer molding of composite articles, that reduces pinching of composite prepregs by mold closures. A mold body has at least one opening and a closure adapted to close the opening. The closure has a side that contacts the article and the closure is received in sliding contact with the mold body to reduce pinching of the composite prepreg.

The foregoing, and other features and advantages of the present will become more apparent from the following description and accompanying drawings.

BRIEF DESCRIPTION OF THE DRAWINGS

FIG. 6 illustrates a perspective view of the resin transfer mold of this invention, disassembled.

FIG. 7 illustrates a cross-section partly broken away taken along line 7—7 of FIG. 6 when fully assembled.

BEST MODE FOR CARRYING OUT THE INVENTION

Figure 1:
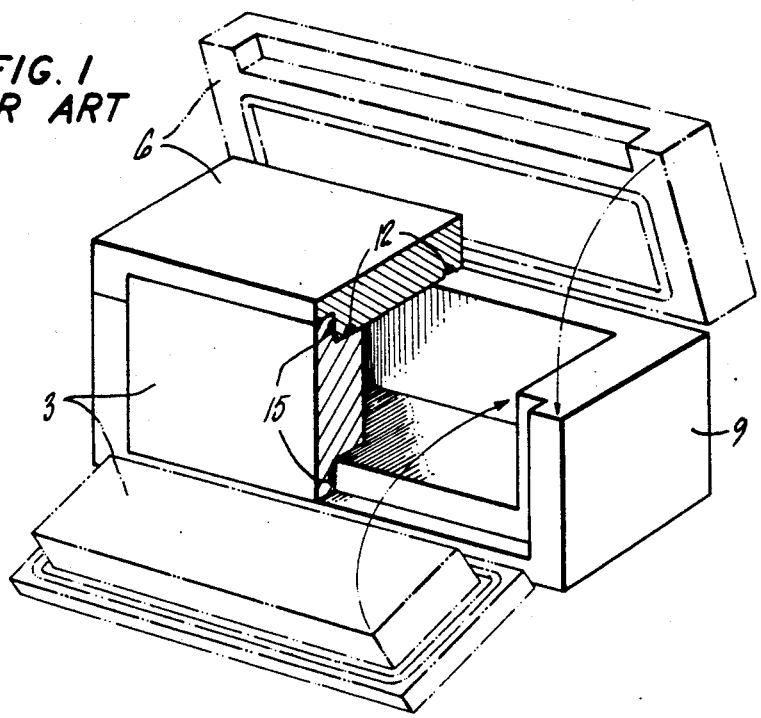
FIG. 1 depicts an assembled perspective view of a prior art mold assembly partly broken away and partly in section. In addition, two closures are shown in phantom prior to assembly of the mold.
Figure 2:
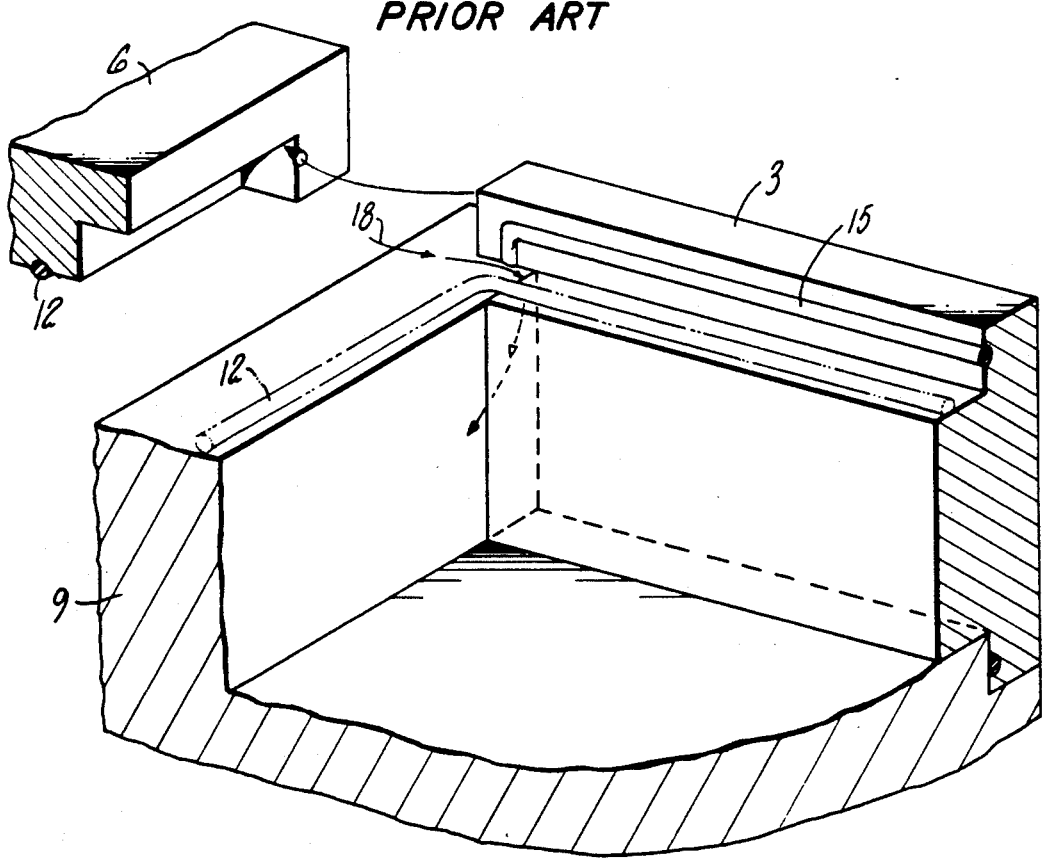
FIG. 2 depicts an enlarged perspective view of the apparatus illustrated in FIG. 1.

A prior art resin transfer mold is depicted in FIGS. 1 and 2. According to FIG. 1 two mold closures 3, 6 close the opening in a mold body 9. Gaskets 12, 15 seal the mold closures 3, 6 to the mold body 9. However, the mold is unable to hold a vacuum because an air leak path exists. These leaks can result in porous composite parts. The leak path is more clearly visible in FIG. 2. In FIG. 2, line 18 illustrates the gas leak path between the mated metal mold surfaces (which are difficult to make airtight) and around the gaskets 12, 15.

Figure 3:
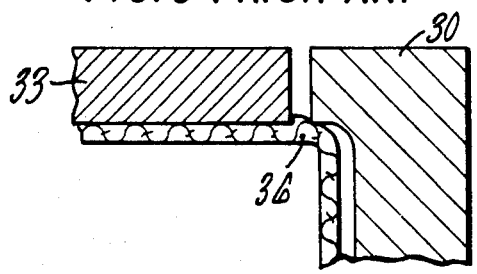
FIG. 3 depicts a simplified sectional view of a typical mold showing the closing thereof.
Figure 4:
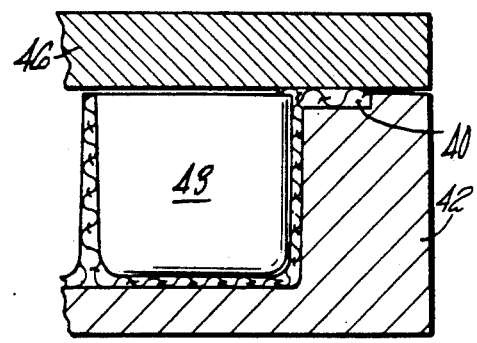
FIGS. 4 and 5 depict a simplified sectional view of a typical mold showing the placement of a mandrel with respect to a mold cover.
Figure 5:
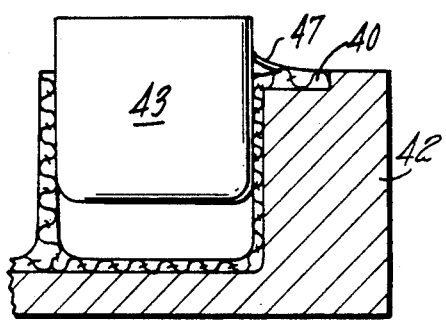

Another problem with the prior art mold is shown in FIG. 3. A mold closure 30 closes against a mold body 33 pinching preform 36. Finally, FIG. 4 illustrates how the preform 40 can be pinched between a mandrel 43, (used for providing shape to the article) the mold body 42, and the mold closure 46 as they are mated. As shown in FIG. 5 this results in delamination of the component 40 at 47 as the mandrel 43 is removed.

Figure 8:
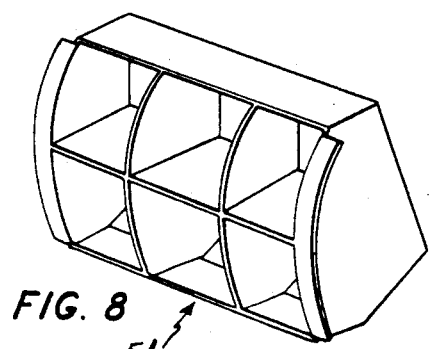
FIG. 8 illustrates a perspective view of a composite part made with the particular resin transfer mold shown in FIG. 6.

A clearer understanding of the invention herein may be had by reference to FIG. 6. In FIG. 6, a mold body 50 and cover 53 have interior surfaces that define an outer mold line (e.g., contour of the composite article) of the article to be molded. The molded article 54 is depicted in FIG. 8. In FIG. 6, adjoining sides 56, 59 of the mold body 50 have openings 62, 65 which are defined by sealing surfaces 66, 67. Closures 69, 71 are adapted for closing openings 62, 65 and thus mating with sealing surfaces 66, 67. Braces 74, 77 are used for supporting and guiding means such as slide actuators 80, 83 so that closures 69, 71 slide in registry with holes 62, 65.

Figure 9:
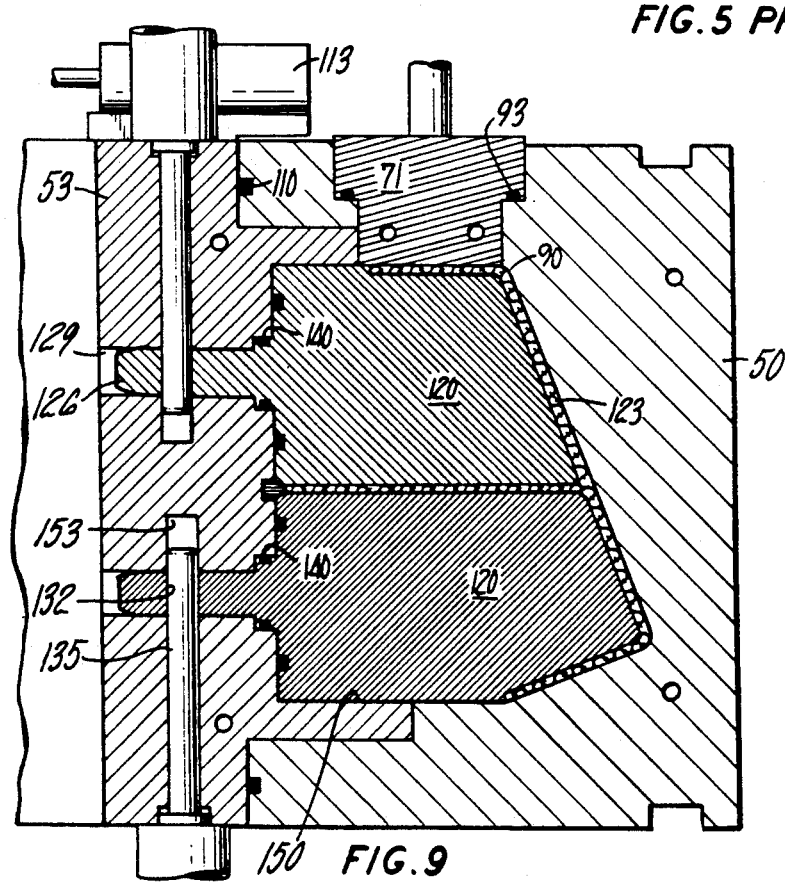
FIG. 9 illustrates a cross-section, partly broken away, taken along line 9—9, of the mold illustrated in FIG. 6, when fully assembled.

The closures are defined at a minimum by adjacent sides of the article to be molded. That is, each closure side has at least the surface area of the article side which it closes against. Thus, closure 71 extends beyond the article side that it closes against. FIG. 7 illustrates how closure member 68 slides against closure 71. These slideable closures facilitate loading and unloading of the composite article by providing clearance between the composite article and the mold body 50 as closure member 68 is retracted from contact with the composite article and closure 71 (e.g., the part is orthogonally unrestrained). In addition, as shown in FIG. 9, the sliding of the closure 71 against the mold body 50 helps reduce the article preform pinching (between the closure 71 and mold body 50) at point 87, in contrast to the prior art as shown in FIG. 3 where the mold closure 30 closed against the mold body 33. This is because it is less likely for preform to be trapped (pinched) between sliding mold parts since there is little space between them in contrast to mold parts that close against each other (e.g., FIG. 3).

In FIGS. 6 and 9, a seal such as gaskets 90, 93 seal closures 69, 71 with the sealing surfaces 66, 67 of sides 56, 59. Since the sealing means forms continuous sealed surfaces (e.g., does not span two surfaces), in contrast to the prior art as shown in FIGS. 1 and 2 described above, the probability of vacuum leaks decreases substantially.

The cover 53 has guidepins 103 around the periphery. The guidepins 103 engage holes 106 located in the mold body 50 to align the cover 53 with the mold body 50. A seal such as a gasket 110 seals the cover 53 to the mold body 56. In a similar fashion to gaskets 90, 93, this seal 110 is effective since the gasket 110 forms a continuous sealed surface (e.g., does not span two surfaces). This sealing mechanism aids in attaining and preserving a vacuum. Ejector pin actuators 113 located on the cover 53 may be used to eject the part from the cover 53. As the cover 53 is raised, the actuators 113 which are linked to pins 116 by conventional means (the linkage is not shown) cause the pins 116 to contact the part separating it from the cover 53.

A desired quantity and shape of mandrels 120 are disposed within the mold body 50. They form an article chamber between the mandrel 120 and the mold body 50 corresponding to the desired shape of the article to be molded. According to FIG. 9, dry fiber preform 123 is laid up on the mandrel 120. The mandrel 120 has a locating pin 126 extending therefrom for engagement with a hole 129 in the cover 53. Locating pin 126 has a hole 132 which receives a locking pin 135 to hold the mandrel 120 in place. Typically, the mandrel 120 extends beyond the top of the desired preform 123, (e.g., beyond the article chamber) and mates with mold cover 53. This aids in eliminating pinching of the article preform between the mandrel 120 and the mold cover 53 as the two are mated, in contrast to the prior art as illustrated in FIG. 4 above. The pinching is reduced since there is no gap between the mandrel and the cover into which the fiber preform is forced. This in turn reduces the delamination that occurred in the prior art as shown in FIG. 5. In FIG. 9, the mandrel 120 also has a seal such as gasket 140 disposed between the fiber preform 123 and the locating pin 126. The sealing means aids in preventing resin flow into the positioning hole 129.

The mandrel is positioned utilizing the following assembly as illustrated in FIGS. 6 and 9. The mold cover 53 has at least one opening 129 for engaging and positioning the locating pin 126. The cover 53 also has means for secondarily adjusting the position of the mandrel such as mold cover cavities 150 that engage the mandrel 120. In addition, pins 135 extend through cover passages 153, and through positioning member holes 132, effectively locking the mandrel 120 in the axis perpendicular to the plane defined by the square positioning hole 129. Thus, the positioning hole 129 locates the mandrel locating pin 126 and hence mandrel 120 to a first tolerance level and then the engagement of the mandrel 120 with the mold cover cavity 150 positions the mandrel 120 to a second higher tolerance level.

The mold housing is provided with thermal control means such as passages 70 for the transfer of a heating-/cooling fluid such as a silicone oil. Alternatively, heater wire may be located in the passages 70 and used to provide heat to the mold.

The above-described molding apparatus is used in a resin transfer molding process. In this process the dry fiber preforms are laid up on the mandrels. The mandrels are inserted inside the mold in their approximate positions. The mold top is closed and locating pins 126 engage positioning holes 129 locating the mandrels 120 in their respective positions. Then locking pins 135 engage the positioning member holes 132 locking the mandrels 120 in place. Slide actuators 80 and 83 move the closures 69 and 71 so that they slide into position into holes 62, 65. These further precisely locate the mandrels and hence preforms. When the mold is fully assembled and the gaskets are properly sealed the chamber is evacuated and resin is transferred under pressure into the article chamber impregnating the dry fiber preform. Since the chamber is fully evacuated, the resin need not be bled and tested in order to check for the presence of air as is typically done.

The resin is forced into the mold under conventional pressures. These typically range from about 85 psi to about 300 psi. Once the mold is full, the resin impregnated preform is exposed to conventional pressures and temperatures appropriate for the particular resin and fiber used. Typically, these pressures and temperatures are about 5 psi to about 300 psi and about ambient to about 500° F. degrees. Once fully cured, the mold can be disassembled. The mold cover can be removed and the closures 69, 71 retracted out of holes 62, 65 creating clearance facilitating the easy removal of the fully cured part.

The fibers and resins used in this invention are those conventional to the art such as glass, polyaramid, graphite, epoxies, polyester, vinyl esters, and phenolics.

This invention provides an improved resin transfer molding apparatus that has an improved seal means for initiating and maintaining a vacuum thus reducing part porosity and eliminating the necessity of passing resin through the mold until all the air is removed. In addition wrinkling and pinching of the preform composite material is substantially reduced by the sliding side portions. Finally adequate access both in loading and unloading the preform and cured composite part are provided.

Although this invention has been shown and described with respect to detailed embodiments thereof, it will be understood by those skilled in art that various changes in form and detail thereof may be made without departing from the spirit and scope of the claimed invention.

We claim:

1. In a mold adapted for resin transfer molding of a composite article by impregnating a preform with resin, the improvement comprising:
   a) a mold body having at least two openings, one of said at least two openings being a removal opening sufficiently large so that said article is removable therethrough;
   b) at least two mold closures, each mold closure having sides, said closures being adapted to close said openings and wherein one of said closures has a preform contacting side that contacts the preform and a closure contacting side which is received in sliding contact with the mold body;
   c) two of said mold closures being in mutual contact within the interior of the mold and defining, at a minimum, entire adjacent sides of the article, said mutually contacting mold closures being in sliding contact with the interior of the body;
   d) a third removal opening having an orientation with respect to said mutually contacting closures such that said article is orthogonally unrestrained by said mutually contacting closures during removal;
   e) seal means for sealing each mold closure continuously to the mold body to continuously seal only a single surface, said seal means being disposed between each closure and said mold body; and
   f) wherein said article is to be provided with a cavity defined by a recess in the interior wall of the article, and wherein a mandrel is disposed in said mold to form said cavity in said article, said mold further including a positioning closure, said mandrel including a distal end for forming said cavity in said article and a base portion for mounting to said positioning closure, said mandrel having a locating pin extending from the base portion and said positioning closure having a first receptacle therein for receiving said mandrel locating pin to mount said mandrel to said positioning closure.

2. The mold as recited in claim 1 wherein said positioning closure has a second receptacle for receiving said mandrel base portion.

3. The mold as recited in claim 2 wherein said positioning closure includes a locking pin and said mandrel locating pin has a receptacle for receiving said locking pin.

* * * * *